United States Patent [19]
Lim

[11] Patent Number: 6,049,307
[45] Date of Patent: *Apr. 11, 2000

[54] ADAPTIVE PHASED ARRAY ANTENNA USING WEIGHT MEMORY UNIT

[75] Inventor: Kyu-Tae Lim, Xonion, Rep. of Korea

[73] Assignee: Samsung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 09/129,172

[22] Filed: Aug. 4, 1998

[30]   Foreign Application Priority Data

Aug. 4, 1997 [KR]   Rep. of Korea ...................... 97-37195

[51] Int. Cl.⁷ ................................. G01S 3/16; G01S 3/28
[52] U.S. Cl. .............................................................. 342/383
[58] Field of Search ...................................... 342/380, 383

[56]   References Cited

U.S. PATENT DOCUMENTS

| | | |
|---|---|---|
| 4,280,128 | 7/1981 | Masak . |
| 5,243,354 | 8/1993 | Stern et al. . |
| 5,327,143 | 7/1994 | Goetz et al. .............................. 342/382 |
| 5,471,220 | 11/1995 | Hammers et al. . |
| 5,856,804 | 1/1999 | Turcotte et al. ......................... 342/371 |
| 5,917,447 | 6/1999 | Wang et al. .............................. 342/383 |

OTHER PUBLICATIONS

Kuga, Nobuhiro and Hiroyuki Arai, "A Flat Four–Beam Switched Array Antenna," IEEE Transaction on Antennas and Propagation, vol. 44. No. 9, Sep. 1996, pp. 1227–1230.

*Primary Examiner*—Theodore M. Blum
*Attorney, Agent, or Firm*—Burns, Doane, Swecker & Mathis, L.L.P.

[57]   ABSTRACT

Transmit adaptive phased array antenna system and receive adaptive phased array antenna system are disclosed which include a transmitter unit; a power divider unit which is connected to the transmitter unit, and when transmitting, divides computed weights; a receiver unit; an array antenna unit wherein multiple basic elements of antenna are spatially arrayed; a power feeder unit which, at the time of receiving, receives receive signal of the array antenna unit and changes amplitude and phase of the receive signal according to another control signal, and at the time of transmitting, receives divided signal from the power divider unit; a power combiner unit which sums receive signals, which are received from the power feeder unit, by using weights; an amplitude detector unit which checks the amplitude of the signals which are received from the power combiner unit, and transmits them to the receiver unit; a beam control unit which receives a portion of the amplitude of summed signals from the amplitude detector, and adjusts beam direction of the antenna, and compares field intensity which is received from each direction, and finds optimized path; and a weight memory unit which is commanded by the beam controller unit to provide power feeder unit with weights which befit their directions.

13 Claims, 6 Drawing Sheets

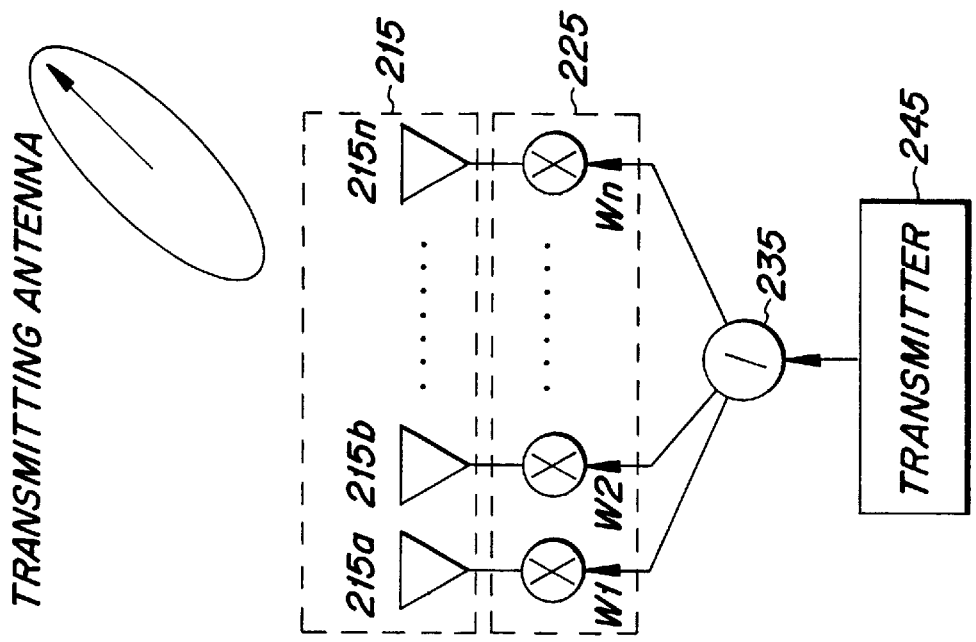
FIG. 2(b) TRANSMITTING ANTENNA
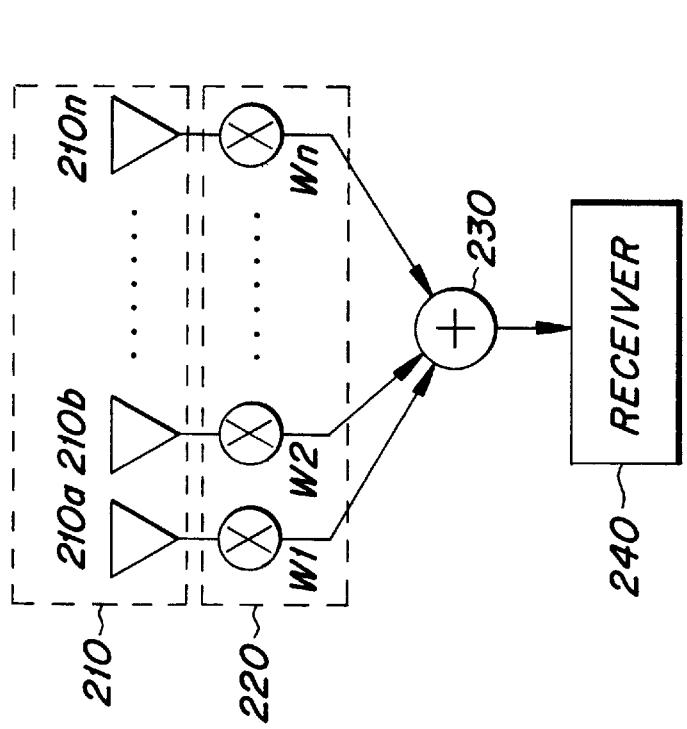
FIG. 2(a) RECEIVING ANTENNA

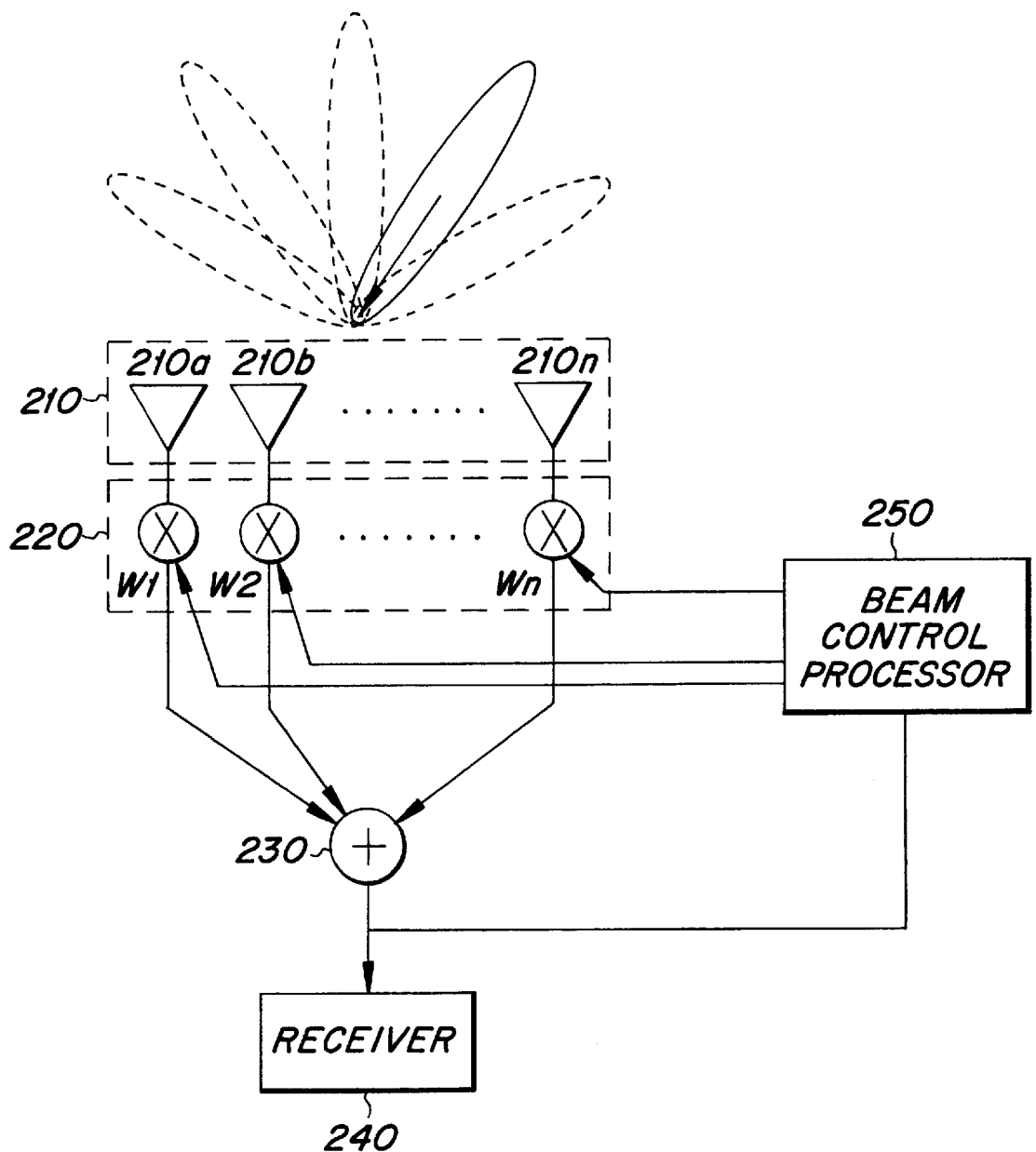

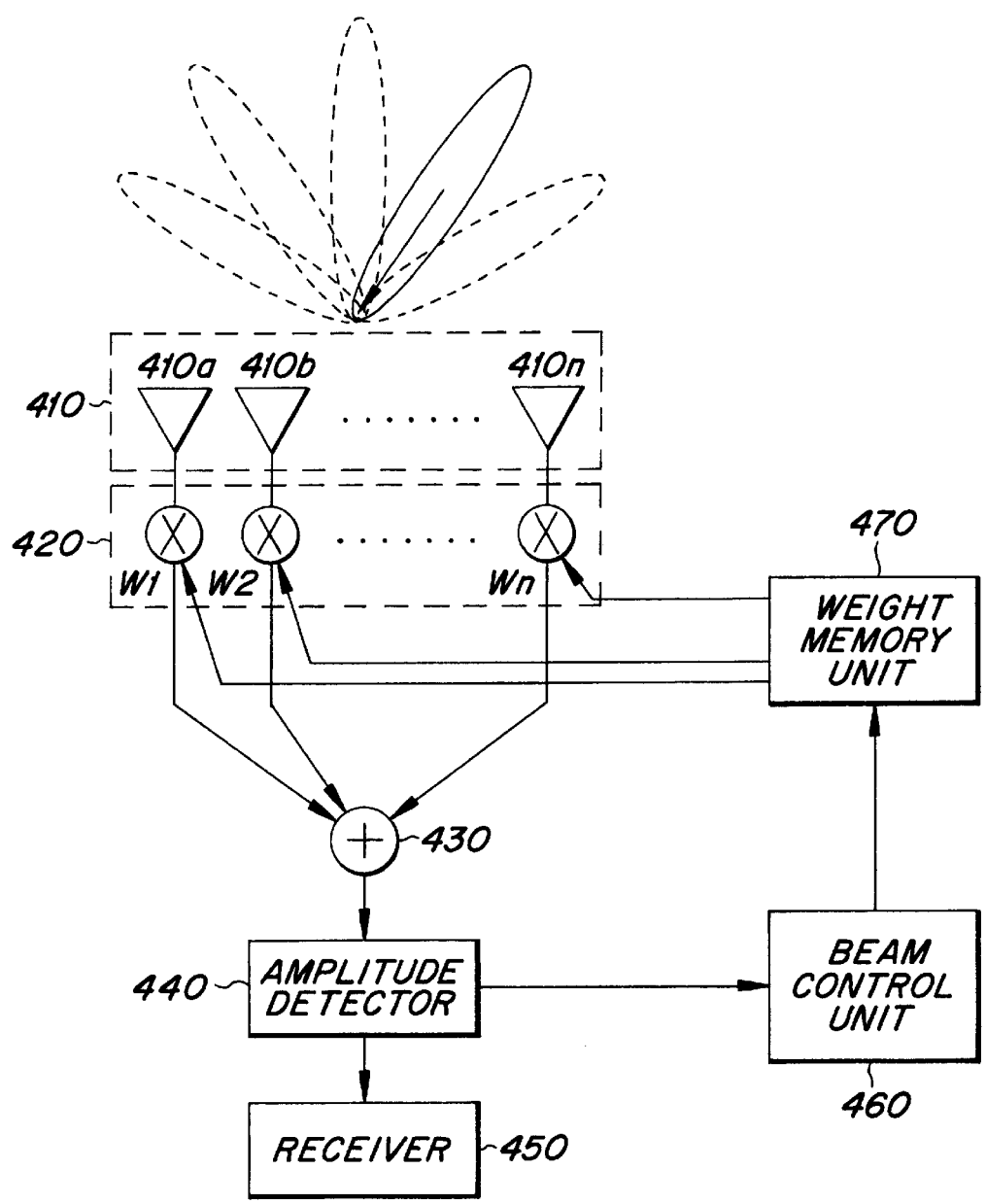

ADAPTIVE PHASED ARRAY ANTENNA USING WEIGHT MEMORY UNIT

FIELD OF THE INVENTION

This invention relates to transmit and receive adaptive phased array antennas using a weight memory unit, and more particularly to an adaptive phased array antenna using a weight memory unit storing pre-computed weights for the array which indicate predetermined beam directions of the antenna, and, using weights corresponding to the beam direction, adjusts the amplitude and phase of the signals which are transmitted or received at each antenna element.

DESCRIPTION OF THE RELATED ART

Generally, there are two kinds of antennas which can electronically move the beam direction of the antenna: a switched beam antenna and an adaptive phased array antenna.

A switched beam antenna is composed of a combination of multiple directive antennas which, by choosing one of the multiple antennas by a multiplexing switch, steers the beam in specific direction. FIG. 1 shows a general diagram of a switched beam antenna system. As illustrated, the general switched beam antenna system is composed of directive antennas (110) which have beam characteristics or patterns in multiple directions, a switch (120) which is used to select a beam of the desired direction, and a transceiver unit (130).

When the desired antenna element (110) is chosen by the switch (120) in the transceiver unit (130), only the chosen antenna element can transmit and receive beams. That is, the multiple directive antennas are arrayed so that the antenna beam may be steered in various directions, and, by attaching a switch to transceiver unit and choosing one directive antenna which steers the beam in a specific direction by the switch, the beam is adjusted to the desired direction.

The switched beam antenna system as described above is simple in structure and cheap in manufacturing cost, but has restricted beam characteristics. When a switched beam antenna is used in a communication system, each antenna element should be chosen such that its beam width is narrow in the horizontal plane and wide in the vertical plane, and there should be enough antenna elements to cover all areas. But these antenna systems have a problem of being greatly influenced by multi-path fading in the vertical direction.

The second type of antenna is the array antenna. An array antenna is an antenna wherein many antenna elements are spatially arrayed. Because the beam pattern of the array antenna is formed by summing the signals which are transmitted or received from each antenna element, the beam pattern has little relation to pattern of antenna elements. By changing the amplitude and phase of the signals which are transmitted or received from each of the antenna elements, an optional beam pattern can be obtained. The variation of phase and amplitude which are supplied to each element is called its weight.

By adjusting in realtime the amplitude and phase of the signals which are received from each antenna element, the adaptive phased array antenna selectively accepts the signals which are received in the desired direction. In current systems, the weights of the amplitude and phase of the signals which are supplied to each antenna are computed according to a weight computing algorithm.

FIGS. 2(a) and 2(b) are schematic diagrams of general array antenna system. Specifically, FIG. 2(a) is a schematic diagram of a receive array antenna system, and FIG. 2(b) is a schematic diagram of a transmit array antenna system.

A receive array antenna system, as illustrated in FIG. 2(a), is composed of multiple antenna elements (210a–210n); a power feeder unit (220) which controls the amplitude and phase of receive signals; a power combiner or summer unit (230) which sums the signals which are received from each antenna element; and a receiver unit (240). When the signals are received from antenna elements (210a–210n), their weights (w1–wn) are computed for each antenna element. After the computed weights are combined in the power combiner unit (230), they are transmitted to the receiver unit (240).

A transmit array antenna system is, as illustrated in FIG. 2(b), composed of multiple antenna elements (215a–215n); a power feeder unit (225) which controls the amplitude and phase of transmit signals; a power divider unit (235) which divides and supplies the signals which are transmitted to each antenna element; and a transmitter unit (245). The weights of the signals transmitted from the transmitter unit (245) are transmitted from the power divider (235) to each power feeder unit (225). In each power feeder (225), beam patterns which will be radiated from each of the antenna elements (215a–215n) according to relevant weights (w1–wn) are determined.

FIG. 3 is a schematic diagram of receive adaptive phase array antenna system according to prior art. As illustrated, prior receive adaptive phase array antenna system is composed of multiple antenna elements (210a–210n); a power feeder unit (220) which controls the amplitude and phase of transmit and receive signals; a power combiner (230) which sums the signals received from each antenna element; a beam adjusting processor (250); and a receiver unit (240). Each element (210a–210n) of the array antenna (210) is connected to an amplifier (or an attenuator) and a phase adjuster (not shown). Power feeders (220) connected to each antenna element (210a–210n) are connected to the receiver unit (240) through the power combiner unit (230). A beam adjusting processor (250) adjusts beams by computing weights (w1–wn) for each antenna element (210a–210n), and providing each antenna element with their respective weights.

The adaptive phase array antenna system described above has the merit of being adapted to any situation because the beam patterns can be changed to an infinite number of beam patterns according to weight computing algorithms. But, in a system with many array elements, the prior adaptive phase array antenna system has to compute a great deal, and so, beam adjusting in realtime by changing signals becomes difficult. Also, because of weight computing algorithm, expensive DSP chips should be used. The result is that the above system becomes very expensive, and applying it to a general commercial system is difficult.

A prior art of this field is U.S. Pat. No. 5,243,354. This patent features a microstrip antenna which is attached to each panel of octagonal pillars, and beam direction is switched by use of switches. But a limit of this patent is that multi-beam antenna using switches can achieve a small number (8) of beam characteristics.

Another prior art of this field is U.S. Pat. No. 5,471,220. This patent is directed to an adaptive array antenna system wherein multi-layers are arranged in a coplanar geometry which provides multiple beams. But a demerit of this patented system is that the system is too complicated to embody and would be expensive.

A related technique paper in this field is "A Flat Four-Beam Switched Array Antenna" disclosed in *IEEE Trans. Antenna and Propagation,* Vol.44, No.9, 1996. This paper discloses a method of obtaining a fixed beam in multiple directions using switches. But this method allows only a small number (4) of beams patterns.

Another related technique in this field is disclosed in the book, *Practical Phased Array*, written by Brookner, published by Artech House. This technique discloses various phase array antenna techniques. But, the disclosed adaptive phase array antenna system is complex, and, because the control circuit computes a great deal, the manufacturing cost would be high.

SUMMARY OF THE INVENTION

It is an object of the present invention to provide an adaptive phase array antenna system using a weight memory unit. The adaptive phase array antenna uses weights computed in advance and stores them using the weight memory unit. This results in saving the time which is needed to compute weights, and allows realtime processing of beams.

It is a further object of this invention to provide an adaptive phase array antenna system using a weight memory unit which allows for many more antenna array elements than found in comparable prior art systems.

It is another object of this invention to provide an adaptive phase array antenna system using a weight memory unit which provides a beam with both a high gain and a high resolution.

A preferred embodiment of a transmit and receive adaptive phased array antenna system using a weight memory unit, including a transmitter unit; a power divider unit which is connected to said transmitter unit, and, when transmitting, divides power according to pre-computed weights; a receiver unit; an array antenna unit wherein multiple antenna elements of said antenna system are spatially arrayed; a power feeder unit which, when receiving, receives received signals from said array antenna unit and changes amplitude and phase of the received signals according to another control signal, and, when transmitting, receives divided signals from said power divider unit; a power combiner unit which sums received signals received from said power feeder unit, using weights; an amplitude detector unit which checks the amplitude of the signals which are received from said power combiner unit, and transmits them to said receiver unit; a beam control unit which receives amplitudes of summed signals from said amplitude detector, and adjusts beam direction of the antenna, and compares field intensity which is received from each direction, and finds an optimized path; and a weight memory unit which is commanded by said beam controller unit to provide power feeder unit with stored weights which befit beam directions selected by said beam control unit.

A preferred embodiment of a apparatus for receive adaptive phased array antenna system, including an array antenna unit wherein basic antenna elements are spatially arrayed; a power feeder unit which receives receive signals from said array antenna; a power combiner unit which sums signals coming from said power feeder unit and, combines them into one signal; an amplitude detector unit which detects strength of said receive signals; a beam control unit which receives detected amplitudes of signals from said amplitude detector; a weight memory unit which is commanded by said beam control unit to provide said power feeder unit with weights which befit directions of the beam selected by said beam control unit; and a receiver unit which receives output signals of said power combiner.

BRIEF DESCRIPTION OF THE DRAWINGS

The nature of the invention and other objects and additional advantages thereof will be more readily understood by those skilled in the art after consideration of the following detailed description taken in conjunction with the accompanying drawings of which:

FIGS. 2(a) and 2(b) are a schematic diagrams of general array antenna system;

FIG. 3 is an adaptive phase array antenna system according to prior art;

FIG. 4 is a schematic diagram of receive adaptive phase array antenna system according to the present invention;

DESCRIPTION OF THE PREFERRED EMBODIMENTS

Figure 1:
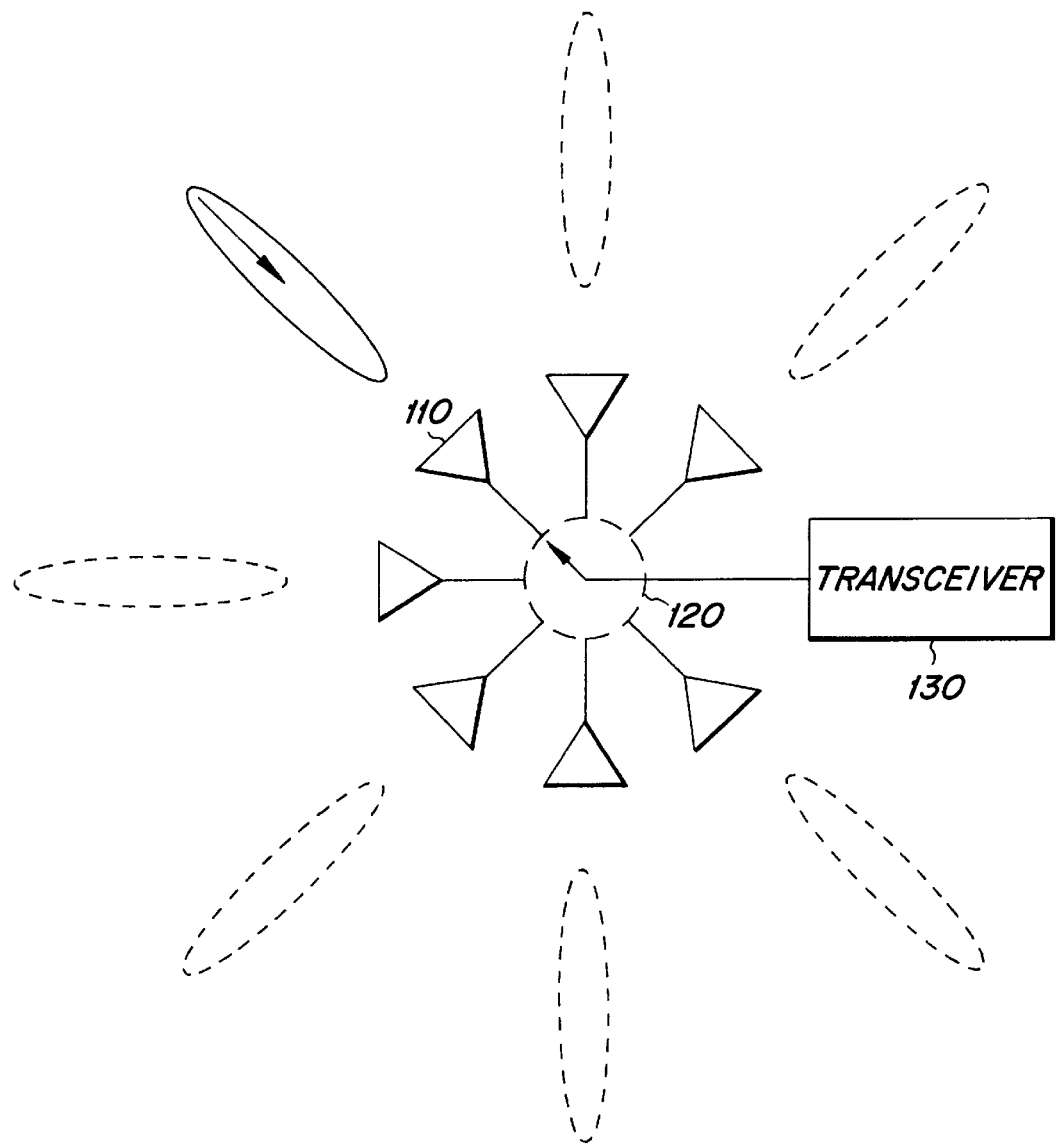
FIG. 1 is a schematic diagram of general switched beam antenna system.

Prior adaptive phase array antenna system finds the position of input signals in realtime and computes weights for the array. In contrast, the present invention computes weights of array in advance and stores them in a memory unit. At the time of changing the direction of the beam of the antenna, the weights in the memory unit are read, and the amplitude and phase of the signals which are transmitted or receives from each antenna element is adjusted.

FIG. 4 is a schematic diagram of an exemplary receive adaptive phase array antenna system according to the present invention. A preferred embodiment of the receive adaptive phase array antenna system according to the present invention is composed of an array antenna unit (410) wherein basic antenna elements (410a–410n) are spatially arrayed; a power feeder unit (420) which receives receive signals from the array antenna (410); a power combiner unit (430) which sums signals coming from the power feeder unit (420) and, combines them into one signal; an amplitude detector unit (440) which detects the strength of the receive signals; a beam control unit (460) which receives the detected amplitude of signals from the amplitude detector; a weight memory unit (470) which is commanded by the beam control unit (460) to provide the power feeder unit (420) with weights which befit the direction of the receive signal; and a receiver unit (450)which transmits output signals of the power combiner unit (430).

The array antenna unit (410), wherein the basic antenna elements (410a–410n) are spatially arrayed, transmits received signals to the power feeder unit (420). In this case, nearly any kind of antenna can be utilized.

Each antenna element (410a–410n) comprising the array antenna unit (410) is connected to an amplifier (or an attenuator) and a phase adjuster of the power feeder unit (420).

Each of the power feeder circuits of power feeder unit (420) is connected to a respective antenna element (410a–410n) of array antenna unit (410). The power feeder circuits are composed of an amplifier or an attenuator and a phase shifter, and change the amplitude and phase of the signals which are received from each antenna element, according to the command fixed by beam control unit (460).

The power combiner unit (430) sums the signals coming from each antenna power feeder circuit into one signal, and transmits it to receiver unit (450). The structure of power combiner unit (430) is determined according to the pattern of transmit lines from the power feeder unit (420).

The amplitude detector unit (440) which is connected between the receiver unit (450) and the power combiner unit (430) detects the strength of receive signals. The amplitude detector unit (440) detects the amplitude of summed signals and transmit it to the beam control unit (460).

The beam control unit (460) is composed of microprocessors or DSP chips, and comparing the amplitude of receive signals which are received from various directions, adjusts the beams to the desired direction.

Also, the beam control unit (460) commands the weight memory unit (470) to provide power feeder unit (420) with weights which are proper for a given direction, and when the amplitude of the signal attenuates suddenly, for instance, finds a new receiving direction.

The weight memory unit (470) may be composed of ROMs (Read Only Memories) or any other type of memory elements capable of storing weights which are pre-computed to adjust the beam direction of antenna.

The weight memory unit (470) transfers weights chosen by the command of the beam control unit (460), to power feeder unit (420).

The structure of the antenna explained above is for receiving, but the structure for transmitting is basically the same. An antenna for transmitting does not need an amplitude detector unit (440) which is needed to determine the receiving direction, and has a power divider instead of a power combiner (430). The power feeder unit (420) contains an amplifier.

Signals received from a transmitter unit are provided to each power feeder circuit with equal power by a power divider, and the beam control unit perform proper amplifying and phase shifting according to the weights which are stored in a weight memory unit, and transfers the signals to antenna elements. Each antenna element radiates the provided power, and in case same weights are given, the antenna pattern for transmitting and receiving is same.

Figure 5:
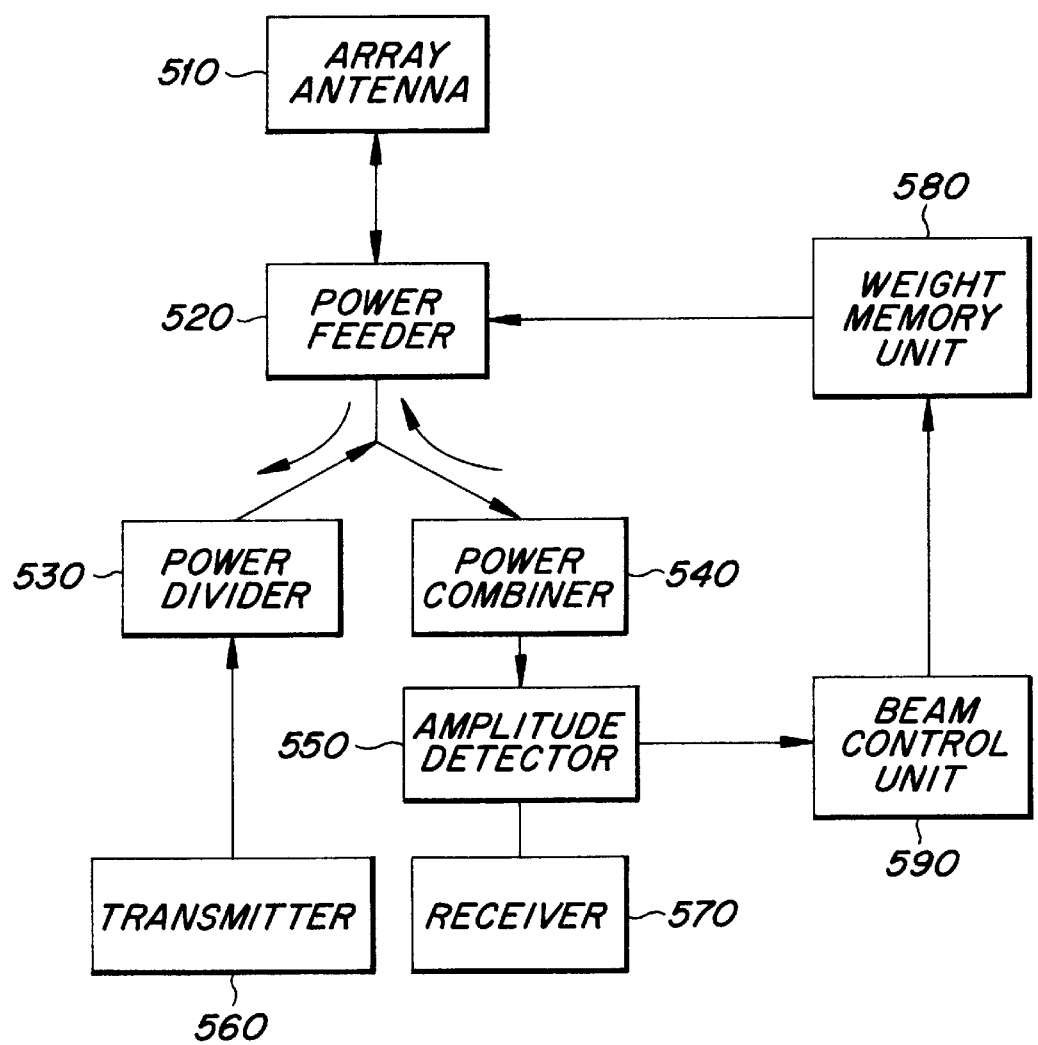
FIG. 5 is a schematic diagram of transmit and receive adaptive phase array antenna system according to the present invention.

FIG. 5 is a schematic diagram of a transmit and receive adaptive phase array antenna system according to the present invention. As illustrated in FIG. 5, a preferred embodiment of a transmit and receive adaptive phase array antenna system according to the present invention is composed of a transmitter unit (560); a power divider unit (530) which is connected to the transmitter unit (560), and, when transmitting, divides computed weights; a receiver unit (570); an array antenna unit (510) wherein multiple basic elements of the antenna are spatially arrayed; a power feeder unit (520) which, when receiving, receives receive signals from the array antenna unit(510) and changes the amplitude and phase of the receive signals according to another control signal, and, when transmitting, receives divided signals from the power divider unit (530); a power combiner unit (540) which sums receive signals, which are received from the power feeder unit (520) using weights; an amplitude detector unit (550) which checks the amplitude of the signals which are received from the power combiner unit (540), and transmits them to the receiver unit (570); a beam control unit (590) which receives some amplitude of summed signals from the amplitude detector (550), and adjusts the beam direction of the antenna array (510), and compares field intensity which is received from each direction to find the optimized path; and a weight memory unit (580) which is commanded by the beam controller unit (590) to provide power feeder unit with weights which befit their directions. The antenna can be used as receive only antenna when it combines with said receiver unit, or can be used as transmit only antenna when it combines with said transmitter unit Since the lower part of antenna can be connected to a circulator or an Ortho-Mode-Transducer (OMT), received signals are transmitted to the receiver, and signals provided from transmitter are radiated through antenna. In this embodiment only one beam control unit and one weight memory unit are needed.

Figure 6:
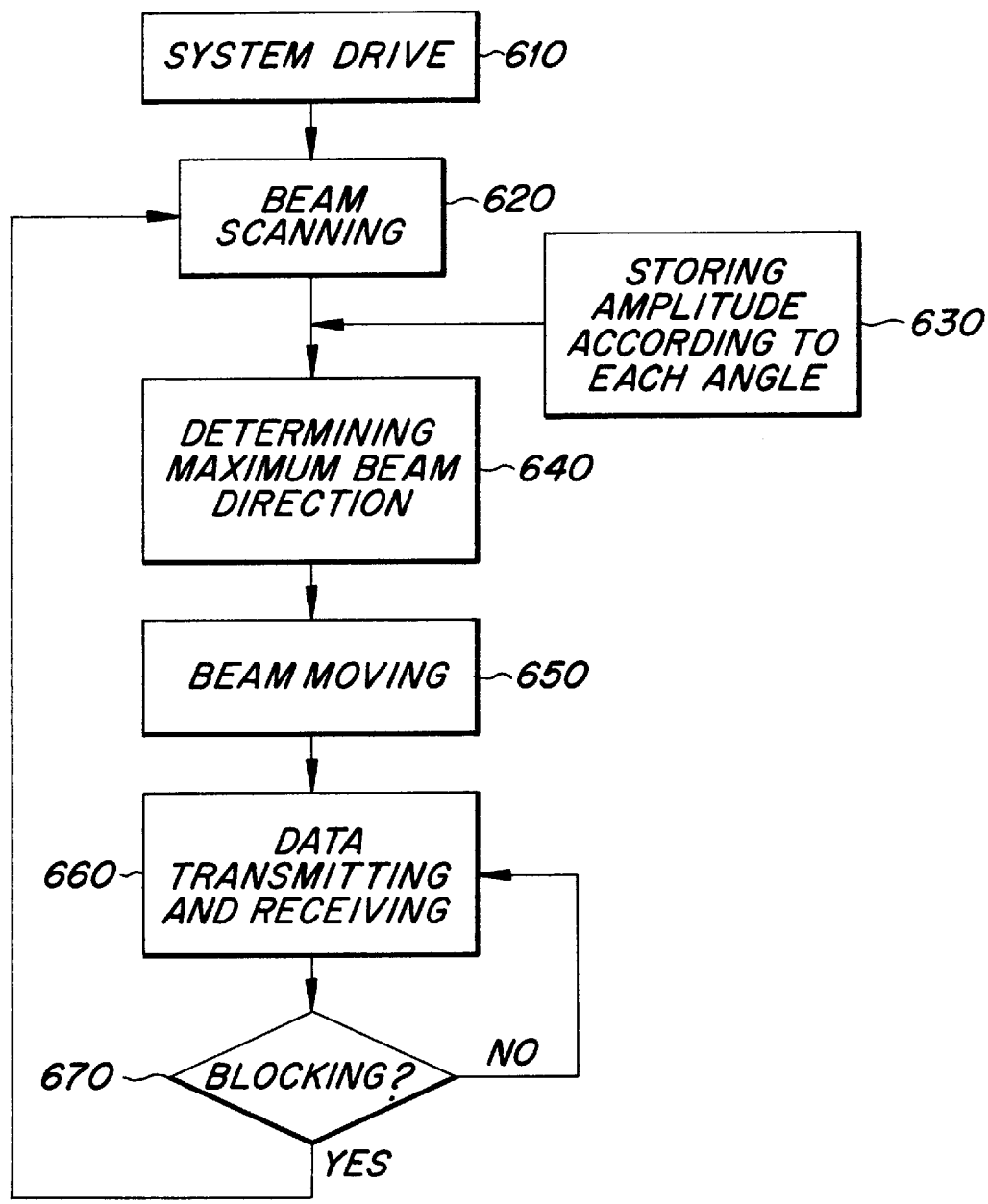
FIG. 6 is a flow chart of transmit and receive adaptive phase array antenna system according to the present invention.

FIG. 6 is a flow chart of the transmit and receive adaptive phase array antenna system according to the present invention.

Referring now to FIG. 6, when the antenna system is driven at step (610), the beam control unit (590) moves the beam direction in a prescribed order, providing the phase shifter and amplitude adjuster of the power feeder unit (520) with the weights (w1–wn) which are stored in weight memory unit (580), at step (620).

At this time, the amplitude detector unit (550) finds the strength of the field which is received according to each beam angle, and stores it in another part of the memory unit (580), at step (630).

When the initial beam scanning is finished, the beam control unit (590) compares the receiving field intensity of various directions on the basis of the scanned values.

Comparing the received field intensity in various directions, the angle with the biggest receiving strength among the scanned beams is selected, at step (640).

Then, at step (650), the beam is moved to direction which was selected at step (640), and at step (660), data is transmitted or received to/from chosen direction.

At this time, the beam control unit (590) continuously observes the strength of received signals which are obtained from the amplitude detector (550), and steering to new maximum beam direction according to the change of the strength of received signals, communication can always be possible.

That is, at step (670) when the receiving intensity of antenna becomes small abruptly, for instance, it is judged that signal blocking has occurred, and the system returns to step (620), where the beam is rescanned, and the new beam direction which has maximum receiving field is found.

By combining the multiple antennas of the present invention working as described above, a multi-beam antenna can be easily embodied.

The effects of transmit and receive adaptive phase array antenna according to the present invention as described above are:

First, since weights are pre-computed and stored, no matrix algorithm for computing the weights being needed, expensive DSP chips do not have to be used, and the cost is more reasonable;

Second, since weights are stored in advance, the amount of computation becomes much lower compared to conventional systems of similar abilities and many more antenna elements can be used. Accordingly, beam characteristics with high gain and high resolution can be obtained; and Third, since the weights are pre-computed, the best beam when physical characteristics of array antenna (e.g. coupling or loss) are considered, can be embodied, and more various beam characteristics can be obtained compared to a switched beam antenna.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A transmit and receive adaptive phased array antenna system using a weight memory unit, comprising:

a transmitter unit;

a power divider unit which is connected to said transmitter unit, and, when transmitting, divides power equally;

a receiver unit;

an array antenna unit wherein multiple antenna elements of said antenna system are spatially arrayed;

a power feeder unit which, when receiving, receives received signals from said array antenna unit and changes amplitude and phase of the received signals according to pre-computed weights controlled by another control signal, and, when transmitting, receives divided signals from said power divider unit and change amplitude and phase of the received divided signals according to the pre-computed weights controlled by still another control signal;

a power combiner unit which sums received signals received from said power feeder unit;

an amplitude detector unit which checks the amplitude of the signals which are received from said power combiner unit, and transmits them to said receiver unit;

a beam control unit which receives amplitudes of summed signals from said amplitude detector, and adjusts beam direction of the antenna by comparing field intensity which is received from each direction, and finding a path having an optimized intensity; and a weight memory unit in which is stored pre-computed values as weights including phase and amplitude of electrical RF signals supplied to each of the basic antenna elements and which is commanded by said beam controller unit to provide power feeder unit with stored weights among a plurality of pre-computed stored weights which correspond to beam directions selected by said beam control unit.

2. An apparatus as set forth in claim 1, wherein said transmit and receive adaptive phase antenna system further comprising one of a circulator and Ortho-Mode Transducer (OMT) for sending signals received from the array antenna unit, when receiving, to the receiver and sending signals received from the transmitter, when transmitting, to the array antenna unit.

3. An apparatus as set forth in claim 1, wherein said power feeder unit comprises one of an attenuator and an amplifier, and a phase shifter, wherein said power feeder unit adjusts the amplitude and phase of the signals according to the weights provided by said weight memory unit.

4. An apparatus as set forth in claim 1, wherein said amplitude detector unit detects strengths of received signals according to the angles of the beam at an initial driving time of the system, and adjusts the angle of the beam of said array antenna unit according to a comparison of the strength of the received signals with a pre-determined value, and said memory unit provides said power feeder unit with the pre-computed weights according to the indication of said beam control unit.

5. An apparatus as set forth in claim 4, wherein said beam control unit rescans the beam when signal blocking occurs, and finds new direction of the beam which has maximum receive strength.

6. An apparatus as set forth in claim 1, wherein said beam control unit includes one of microprocessors and DSP chips, adjusts the beam direction of antenna, and compares field intensity which is received from each direction, so as to move the beam in a direction in which the maximum signal strength is found.

7. An apparatus as set forth in claim 6, wherein said beam control unit rescans beam and finds a new path having an optimized intensity, and adjusts beam direction of the antenna according to the pre-computed weights in accordance with the new path when the receive field suddenly becomes lower than a threshold value.

8. An apparatus as set forth in claim 1, wherein said amplitude detector unit detects amplitudes of the signals which are received from said array antenna, and transfers the detected amplitudes to the beam controller.

9. An apparatus as set forth in claim 1, wherein said antenna is used as receive only antenna when said receiver unit is active and is used as transmit only antenna when said transmitter unit is active.

10. An apparatus for a receive adaptive phased array antenna system, comprising:

an array antenna unit wherein basic antenna elements are spatially arrayed;

a power feeder unit which receives receive signals from said array antenna;

a power combiner unit which sums signals coming from said power feeder unit and, combines them into one signal;

an amplitude detector unit which detects strength of said receive signals;

a beam control unit which receives detected amplitudes of signals from said amplitude detector;

a weight memory unit in which is stored pre-computed values as weights including phase and amplitude of electrical RF signals supplied to each of the basic antenna elements and which is commanded by said beam control unit to provide said power feeder unit with stored weights among a plurality of pre-computed stored weights which correspond to directions of the beam selected by said beam control unit; and a receiver unit which receives output signals of said power combiner.

11. An apparatus as set forth in claim 10, wherein said beam control unit is composed of one of microprocessors and DSP chips.

12. An apparatus as set forth in claim 10, wherein said power feeder unit line includes one of an amplifier and a combination of an attenuator and a phase shifter.

13. An apparatus as set forth in claim 10, wherein said power feeder unit adjusts amplitude and phase of the signals which are received from each antenna elements according to commands fixed by beam control unit.

* * * * *